United States Patent [19]

Booth

[11] 4,017,158

[45] Apr. 12, 1977

[54] SPATIAL FREQUENCY CARRIER AND PROCESS OF PREPARING SAME

[75] Inventor: Bruce Lee Booth, Hockessin, Del.

[73] Assignee: E. I. Du Pont de Nemours and Company, Wilmington, Del.

[22] Filed: Mar. 17, 1975

[21] Appl. No.: 559,168

[52] U.S. Cl. .......................... 350/162 SF; 96/27 H; 350/3.5

[51] Int. Cl.² ..................... G02B 27/38; G03H 1/02

[58] Field of Search ..................... 350/3.5, 162 SF; 96/27 H, 35.1; 353/31

[56] References Cited

UNITED STATES PATENTS

| | | | |
|---|---|---|---|
| 3,314,052 | 4/1967 | Lohmann | 350/162 SF |
| 3,658,526 | 4/1972 | Haugh | 350/3.5 |
| 3,667,946 | 6/1972 | Sturdevant | 350/3.5 |
| 3,695,744 | 10/1972 | Clay | 350/3.5 |
| 3,716,286 | 2/1973 | St. John | 350/3.5 |
| 3,732,363 | 5/1973 | Glenn | 350/162 SF |
| 3,947,105 | 3/1976 | Smith | 350/162 SF |

Primary Examiner—Ronald J. Stern

[57] ABSTRACT

A transparency for reproducing preselected area delineations in colors and intensities thereof variable at will is formed by using an interference pattern formed holographically by the interference of a split laser beam. The transparency has a plurality of mutually exclusive areas each individual area representing a variable color wherein the area or areas representing a particular variable color contains spatial frequency carriers which are oriented differently from the spatial frequency carriers of the other areas. The holographic process of preparing the transparency by separately exposing each area in a different orientation to the interference of the two said laser beams is also disclosed. The process and apparatus for utilizing the separation transparency to form predetermined images wherein the color of the individual areas and the intensity thereof forming such image may be varied at will is also disclosed.

2 Claims, 8 Drawing Figures

SPATIAL FREQUENCY CARRIER AND PROCESS OF PREPARING SAME

BACKGROUND OF THE INVENTION

1. Field of the Invention

The present invention relates to a transparency for reproducing area delineations of colored areas of a pattern on a display in an optical viewer. The transparency is made of a photopolymerizable material with mutually exclusive areas, each individual area representing a variable color wherein each area repesenting a particular variable color has encoded therein preselected angularly oriented spatial frequency carriers created holographically by the interference of a split laser beam.

2. Description of the Prior Art

In many industries and especially in the textile industry a designer for styling purposes has a need for viewing different color combinations of a pattern in which each color may be individually manipulated at will through the entire range of color. Systems have been proposed which enable selected color combinations of a pattern to be viewed on a visual display. An example of such a system is an optical viewer which utilizes a light source and a photographic plate. The photographic plate encoded encodes with a spatial frequency carrier for each area for the pattern, with the encoded areas diffracting light from the light source to reproduce the pattern on a display. The light is colorable and enables the pattern to be colored in a variety of color combinations. It is further known to use a camera to photograph the displayed pattern to make a proof.

In the past the encoded frequency carrier used in the above-described system has been prepared using silver halide based systems. The technique involves focusing a Ronchi ruling on an emulsion containing the silver halide to expose the silver halide followed by developing the exposed silver halide. This type of diffraction grating cannot diffract more than about 7% of the light passed therethrough into the first order of diffraction. Because of this these diffraction gratings are often bleached to change the silver halide into a transparent salt with a different index of refraction than the emulsion creating a phase diffraction grating medium having improved diffraction efficiency. The bleaching process often produces imperfections in the gratings which results in "noise" when light is passed through the grating. In either case the resulting diffraction grating consists of lines of emulsion which are rectangular in cross-section and usually about 10–15 microns in thickness supported on a transparent support such as glass or organic resin film. The rectangular cross-section of the grating lines in either type grating in effect gives them a multiple frequency and produces many orders of diffraction. The use of a Ronchi grating places a practical limit to the spacing of the lines to a maximum of about 200 lines per millimeter. A thin phase grating can theoretically diffract up to about 33% of the light passed therethrough into the first order of diffraction, but in practice the amount for a bleached grating is usually in the range of 15 to 20%. It is desirable to increase the amount of light passed into the first order of diffraction and additionally to eliminate the higher orders since they must be blanked out.

SUMMARY OF THE INVENTION

The present invention relates to a transparency for reproducing area delineations of colored areas of a pattern on a display in an optical viewer and its preparation which is useful in a technique in which area delineations of the colored areas of a pattern are reproduced on a display. The method for preparing this transparency involves forming a plurality of masks which are severally adapted to individually expose to light the various areas of a pattern which areas represent individual colors of said pattern. These masks are then used to expose individually areas of a photopolymerizable material to the interference of two laser beams to record holographically a spatial frequency carrier in each area. Each area is exposed separately at a different radial orientation to the laser interference so as to be able to diffract light in a different direction so that a plurality of radially arranged light sources having their color variable at will may be passed through the transparency and focused on a display.

DETAILED DESCRIPTION

In the process of the present invention separation negatives are utilized in a procedure for making a replica of a pattern. The replica is made of a photopolymerizable material on which area delineations are reproduced and encoded with preselected angularly oriented spatial frequency carriers. The replica is then used in an optical viewer to reproduce the area delineations on a display. The area delineations are colored independently with selected colors.

Figure 1:
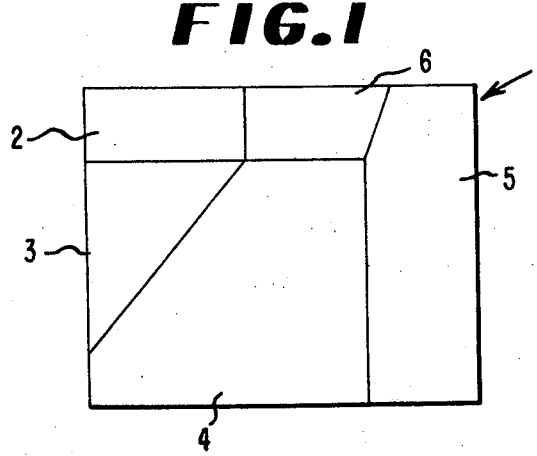
FIG. 1 is a pattern divided into mutually exclusive area delineations of independently colorable areas of the pattern.

FIG. 1 is a representative pattern 1 composed of five mutually exclusive area delineations of independently colorable area 2, 3, 4, 5 and 6.

Figure 3:
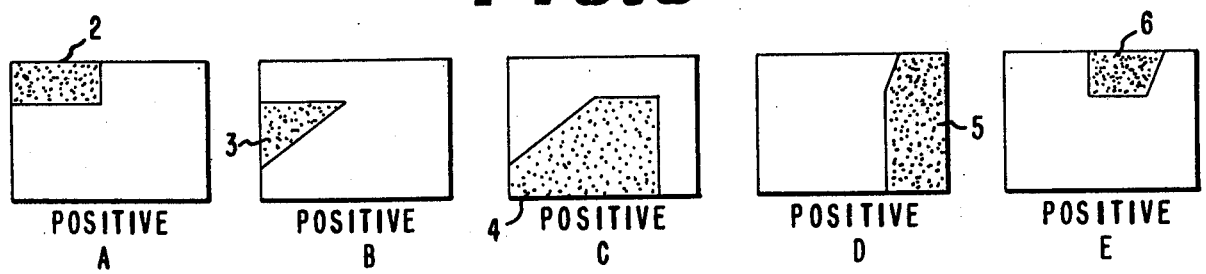
FIG. 3 shows separation positives for each of the area delineations of FIG. 1.
Figure 4:
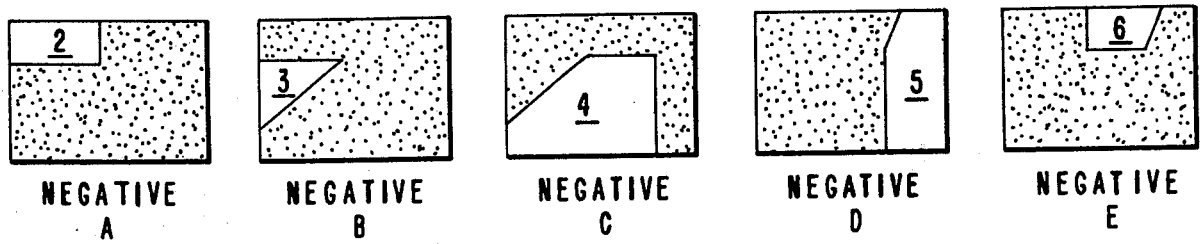
FIG. 4 shows separation negatives for each of the area delineations of FIG. 1.

Positive and negative area separation transparencies as shown in FIGS. 3 and 4, respectively, are prepared by known methods for each area delineation shown in FIG. 1. The separation positives A–E of FIG. 3 are prepared first with each positive having an opaque portion (stippling shows opacity) which has the same shape and relative position as the corresponding area delineation of the pattern. The remainder of each positive is transparent. The separation negatives A–E of FIG. 4 are then produced from the positives. The negatives are reduced in size from the positives using a copy camera. Each negative has a transparent portion which has the same shape and relative position as the corresponding area delineation of the pattern with the rest of the negative being opaque. Transparency A of FIG. 4 shows an example of the separation negative for area delineation 2 of the pattern. The portion corresponding to area delineation 2 is transparent while the rest of the negative is opaque. The positive transparency A of FIG. 3 is similar but with the opaque and transparent areas reversed.

Figure 2:
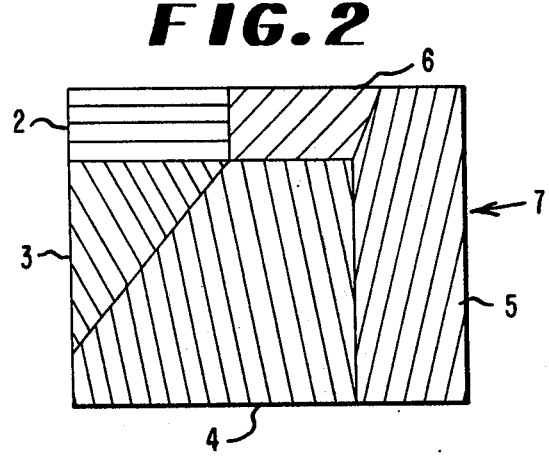
FIG. 2 is a replica of FIG. 1 on which the area delineations are reproduced and encoded within their boundaries by uniquely spatial frequency carriers.
Figure 5:
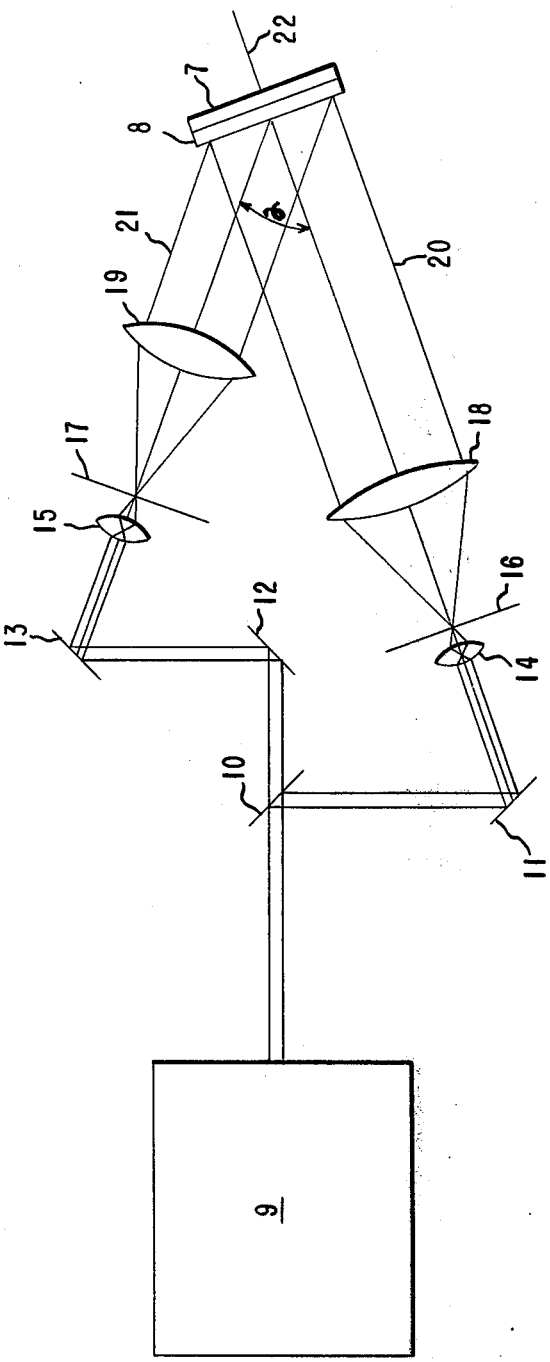
FIG. 5 shows a laser beam splitter and mirror system for forming a interference pattern holographically on the transparency.
Figure 6:
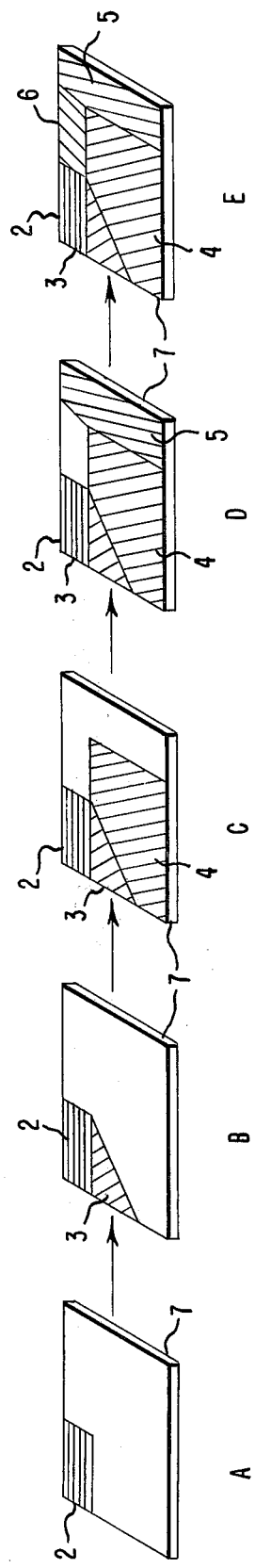
FIG. 6 shows the separation transparency as the preselected angularly oriented spatial frequency carrier is applied thereto stepwise for each area delineation.

The separation negatives A-E of FIG. 4 are used as masks to encode replica 7 shown in FIG. 2 by the stepwise method shown in FIG. 5 and FIG. 6. To encode the first area delineation negative 4A is used as mask 8 which masks photopolymerizable sheet 7. The light from laser 9 is split into two beams of essentially equal intensity of light by beam splitter 10 which directs the two beams to mirrors 11 and 12. The light from mirror 12 is beamed to mirror 13. The light beams from mirrors 11 and 13 are directed through focusing lenses 14 and 15, respectively, then through spatial filters 16 and 17, respectively, and finally through collimating lenses 18 and 19, respectively. The spatial frequency filters generally are 5 to 25 micron pinholes in an opaque sheet located at the focal point of focusing lenses 14 and 15 to remove noise (i.e., nonparallel light) as diffracted by the lenses 14 or 15. The presence of such noise is generally due to either imperfections of dust on the lenses or the mirrors between the laser 9 and the focusing lenses 14 and 15. The two collimating lenses are optional. Mirrors 11 and 13 are positioned so that the collimated light beams 20 and 21 issuing from lenses 18 and 19 produce an interference pattern on sheet 7 wich is positioned essentially at a 90° angle from the collimated light beam 20 issuing from lens 18. The angle $\alpha$ between the interfering collimated beams 20 and 21 is typically about 17° to insure a spatial frequency of between 500 and 750 lines per millimeter. The interference pattern created by the two laser beams causes a diffraction grating or spatial frequency carrier to be formed in the photohardenable material. In the preferred process after a short time the photopolymerizable material is reexposed to single laser beam 20 to harden the remaining material without encoding a carrier therein. Sheet 7 preferably is a layer of photopolymer mounted on a suitable support such as glass.

Thus, to make a separation transparency of this invention negative A of FIG. 4 is placed in position 8 in FIG. 5 to serve as a mask and the shutter of a laser is opened for 10 seconds to expose area 2 of sheet 7 with a spatial frequency carrier having the orientation indicated for area 2 of sheet 7 in FIG. 6. It is to be understood that the exposure of 10 seconds and other time intervals used herein are illustrative and that the preferred time to be used in a specific instance may vary according to the sensitivity of the photopolymer or other photosensitive material used and the intensity of the light used. After 60 seconds the shutter of laser 9 is opened for 120 seconds with the beam 21 blocked to photopolymerize the residual monomer remaining in area 2 of sheet 7. Then negative A is removed from sheet 7 and replaced with negative B. The entire assembly of 7 and 8 is then rotated 72° about axis 22 as shown in FIG. 5 which axis is normal to the plane of the assembly of mask 7 and sheet 8. the shutter of laser 9 is again opened for 10 seconds using the interfering beams from the beam splitter 10 to encode exposed area 3 of sheet 7 with a spatial frequency carrier having an orientation as indicated for area 3 of sheet 7 in FIG. 6. After 60 seconds the shutter of laser 9 is opened with beam 21 blocked for 120 seconds to photopolymerize the unphotopolymerized material remaining in area 3 of sheet 7. Negative B is then removed from sheet 7 and replaced with negative C. The entire assembly of 7 and 8 is then rotated an additional 72° about axis 22 as shown in FIG. 5. The shutter of laser 9 is again opened for 10 seconds using interfering beams 20 and 21 from beam splitter 10 to encode area 4 of sheet 7 with a spatial frequency carrier having a different orientation as indicated for area 4 of sheet 7 in FIG. 6. After 60 seconds the shutter of laser 9 is again opened with beam 21 blocked for 120 seconds to photopolymerize the unphotopolymerized material remaining in area 4 of sheet 7. Negative C is then removed from sheet 7 and replaced with negative D. The assembly 7 and 8 is again rotated an additional 72° about axis 22. The shutter of laser 9 is again opened for 10 seconds using the interfering beams 20 and 21 from beam splitter 10 to encode exposed area 5 of sheet 7 with a spatial frequency carrier having the new orientation as indicated for area 5 of sheet 7 in FIG. 6. After 60 seconds the shutter of laser 9 is then opened with beam 21 blocked again for 120 seconds to photopolymerize the unphotopolymerized material remaining in area 5 of sheet 7. Negative D is then removed from sheet 12. Finally sheet 7 is then rotated an additional 72° about axis 22. The shutter of laser 9 is again opened for 10 seconds using interfering beams 20 and 21 from beam splitter 10 to encode area 6 of sheet 7 with a spatial frequency carrier having the different orientation as indicated for area 6 of sheet 7 in FIG. 6. After 60 seconds the shutter of laser 9 is then opened with beam 21 blocked to photopolymerize the unphotopolymerized material remaining in area 6 of sheet 7. It should be noted that after the encoding of each of areas 2 to 5 of sheet 7 with the spatial frequency carrier, the remaining unphotopolymerized material in each area was photopolymerized in such a way that no additional carrier encodement took place. This meant that when area 6 was exposed to the spatial frequency carrier encodement step no mask was necessary and, thus, the need to prepare negative E was eliminated. If this photopolymerization of the unphotopolymerized material remaining after each of the spatial frequency carrier encodement steps is not done, it is then necessary to use negative E as mask 8 in the last step. Negative E is also necessary when using a silver halide emulsion. The remaining unphotopolymerized material in each of the masked areas can then be photopolymerized all at once by exposure of whole sheet 7 to ordinary light. It is to be understood that prior to completion of the last spatial carrier encodement step that sheet 7 of photopolymerizable material is to be maintained in the dark or in the presence of safe lights to protect from exposure to wavelengths of light which will initiate photopolymerization except for the specific exposure steps set forth above. Obviously a greater or fewer number of area delineations can be used. Because there are five areas used in the foregoing description, the angular orientation of the spatial frequency carriers are separated by essentially uniform 72° intervals, although if a greater number of areas are used, the intervals will be less. In the past using bleached silver halide spatial frequency carriers prepared using Ronchi rulings, it has been necessary to maintain a minimum of about 72° between the radial orientation of each of the spatial frequency carriers thus limiting the number of area delineations on a transparency. The transparencies of the present invention function without cross talk between areas when the radial orientation between each of the spatial frequency carriers is as small as 20° thus enabling a transparency to have up to eighteen area delineations encoded thereon. This is due principally to the elimination of the higher orders of diffraction which are difficult to mask from several pattern areas.

After the transparency is produced, it can be removed from the support and mounted between thin glass slides using optical cement.

Figure 7:
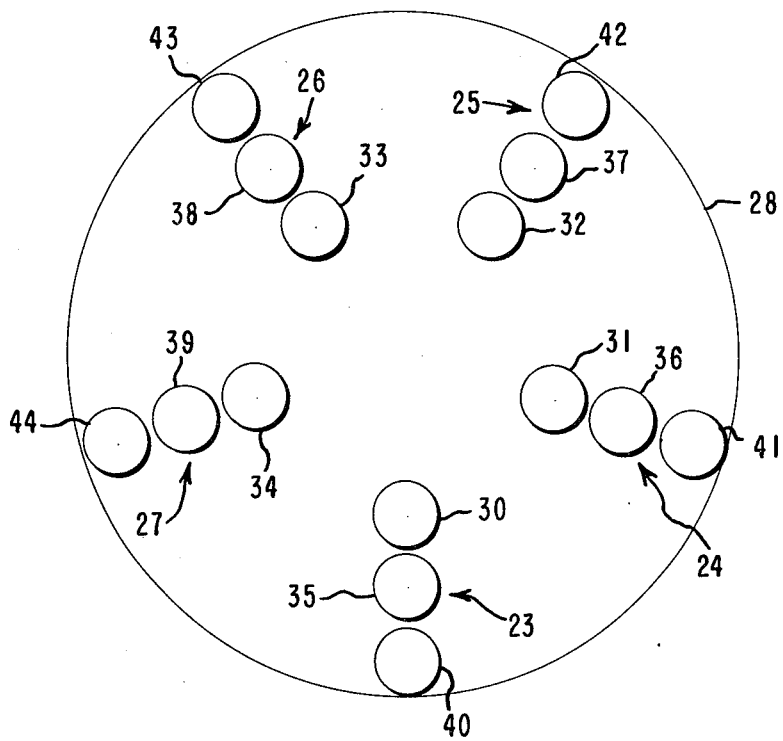
FIG. 7 is a plan view of a circle containing the light sources used to illuminate the spatial frequency carrier.
Figure 8:
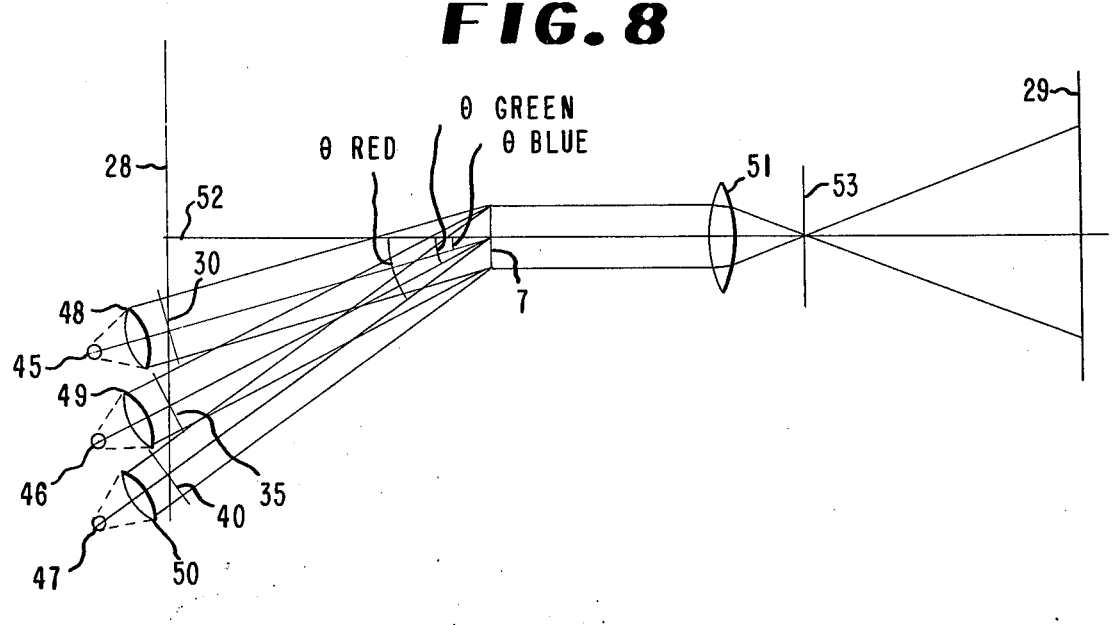
FIG. 8 is a schematic representation of a system for reproducing the area delineations of the pattern on the display.

In order to reconstruct the combined image of the recorded designs in the compound grating and display each image area in various infinitely variable colors for viewing, a suitable display system will be described with reference to FIGS. 7 and 8. In order to reimage the information recorded on the five area delineation transparency sheet 7 prepared above, five light source positions 23, 24, 25, 26, 27 are positioned equidistant around the circumference of an imaginary circle 28 as shown in FIG. 7 standing in a plane parallel to transparency sheet 7 and display image 29 as shown in FIG. 8. There are three lights in each of these five positions. The innermost light of each position is set up with blue light filters 30, 31, 32, 33, and 34 and the light sources are directed toward the transparency sheet 7 positioned in space with the surface normal passing through the center of the imaginary circle containing the lights. The angular displacement of the lights from the normal is determined by the Bragg angle which is a function of the blue wavelength transmitted by the blue filters 30, 31, 32, 33, and 34 and the spatial frequency encoded in transparency sheet 7. The equation for determining the Bragg angle is $$\sin(\theta/2) = \lambda/2d$$

where $\theta/2$ is the Bragg angle, $\lambda$ is the wavelength of light in mm and $1/d =$ the number of lines per mm encoded in the spatial frequency carrier. The middle light of each of the five light source positions is arranged radially displaced further from the center of the imaginary circle 28 they are contained within than the innermost circle of lights. All five middle light sources are set up with green filters 35, 36, 37, 38 and 39. Again the distance the light sources are displaced from the center of the imaginary circle 28 is determined by the Bragg angle. A third light of each of the five light source positions is arranged radially displaced further from the center of the imaginary circle 28 they are contained within the middle lights. All five of these outer light sources are set up with red filters 40, 41, 42, 43 and 44. Again the distance the light sources are displaced from the center of the imaginary circle 28 is determined by the Bragg angle. Each position of three lights is arranged around the circle spaced 72° from its neighboring position of three lights.

FIG. 8 is a schematic representation of a side view of a system for reproducing the area delineations of transparency 7 on display 29. For clarity only one light source position indicated generally at 23 is shown. Each light source position comprises three light bulbs 45, 46 and 47 equipped with a collimating lens 48, 49 and 50, respectively. The three individual lights 45, 46 and 47 are also equipped with blue filter 30, green filter 35 and red filter 40, respectively. Each light 45, 46 and 47 is also equipped with means not shown to vary the intensity thereof. Suitable means can be a rheostat or variac to control the current fed to each light or a diaphragm or neutral density filter interposed between the individual light bulbs and their collimating lens. By varying the relative amounts of red, green and blue light the color produced by light source position 23 can be infinitely varied at will. The area delineation of transparency 7 which is to cooperate with light source position 23 is rotationally oriented so that light from light source position 23 will be diffracted to lens 51 and focused on display 29. Each of the three individual light sources which make up light source position 23 are radially displaced from axis 52 by an amount determined by the Bragg angle which is fixed by the spatial frequency encoded in transparency 7 and the wavelength of the light transmitted by filters 30, 35 and 40. The light from light source position 23 which is not incident on the area delineation which is oriented to cooperate with light source position 23 will not be diffracted because of the difference in the orientation of the spatial frequency carrier. Zero order light, i.e., light which passes through transparency 7 without being diffracted, is blocked by stop 53. In the same way light from remaining light source positions 24, 25, 26 and 27 is directed through transparency 7 focusing lens 51, and the aperture of stop 53 to reproduce area delineations 2, 3, 4, 5 and 6 on display 29. It sould be recalled that higher order light is not present in the preferred embodiment using photopolymers and thus need not be blocked.

An alternative method of recording a pattern on a grating and reimaging a pattern on the screen may be accomplished by using converging light both in recording and reconstruction in place of the collimated light used in the above example. Another alternative is to substitute diverging light for both the recording of the pattern and reconstruction of the image. Another option which may be employed is to substitute one xenon or other white light for the tungsten lights. Instead of employing three separate light sources for each of the five positions, a single xenon light source can be used in conjunction with either a series of mirrors or optical fibers in order to transmit light from the single source to the five equispaced positions on the circumference of each of the three light circles.

The invention may be practiced using a different number of masks other than the illustrated four to record different patterns; e.g., 2–20 different masks. Also the number of color filters may be varied; e.g., from 2–6.

Transparency 7 preferably is prepared by casting a photopolymerizable composition on a glass plate or other support followed by the sequential exposure process described above. Suitable photopolymerizable materials are disclosed in U.S. Pat. No. 3,658,526, issued Apr. 25, 1972, to Haugh. Generally these photopolymerizable compositions contain (1) at least one polymerizable, nongaseous, ethylenically unsaturated monomeric compound having a boiling point above 100° C. at normal atmospheric pressure and being capable of forming a high polymer by free radical initiated, chain-propagating addition polymerization; and (2) a free radical generating polymerization initiator or system activatable by actinic radiation. In addition to components (1) and (2), the photopolymerizable material can contain an organic binder, a plasticizer for the binder, a thermal polymerization inhibitor, and a chain transfer agent or polymerization accelerator and other components.

A suitable composition for use herein is 5.2 g. of cellulose acetate butyrate (ca. 17% butyryl, ca. 29.5% acetyl, and ca. 1.5% hydroxyl: having a viscosity of 117 poises as determined by ASTM Method D-1343-54T in solution as Formula A, ASTM Method D-871-54T); 5.8 g. triethyleneglycol diacrylate; 0.6 g. 2-o-chlorophenyl-4,5-di(m-methoxyphenyl)imidazolyl dimer; 0.3 g. (3,4-dimethoxyphenyl)-bis(2-methyl-4-diethylaminophenyl)methane; 0.02 g. N-phenylglycine; 0.2 ml ethylene bis(2-oxyethyl)acetate; and 80 g. of a solvent which is 10 weight percent 1,2-dichloroethane and 90 weight percent dichloromethane. The above composition is prepared by mixing and then cast on a glass plate, and air dried in the dark to give a coating weight of 5 mg./cm$^2$.

The photopolymerizable material when exposed properly can give a transparency having a carrier having spatial frequency of up to about 3,000 lines per millimeter. The number of lines per millimeter obtained in the transparency is a function of the wavelength of the light produced by laser 9 and angle $\alpha$ (FIG. 5) between the reference beam 20 and split beam 21 when forming the interference pattern on transparency 7. The preferred range is from 500 to 750 lines per millimeter. This preferred frequency range can be obtained using an argon laser (4880 A) and a angle $\alpha$ between reference beam 20 and split beam 21 of about 17°.

The transparency encoded with the spatial frequency carrier of the present invention is generally from 50 to 100 microns in thickness. This compares with about 10-15 microns in thickness which is about the typical optimum with the silver halide diffraction gratings prepared using either the Ronchi ruling or the holographic process. The use of laser interference beams to create the spatial frequency carrier results in the carrier being formed of transparent wavelike regions of photopolymer embedded in transparent photopolymer having a somewhat different refractive index than the refractive index of the wavelike regions. These wavelike regions are disposed through the thickness of the transparency 7 at a small angle to the normal to the surface being the angle which is essentially the bisector of the angle of the two beams 20, 21 used to create them. The fact that it is transparent enables pratically 100% light transmission by the transparency. The fact that the transparency is a thick grating enables it to diffract about 98-99% of the transmitted light into the +1 order of diffraction. In practice about 50 to 60% of the light is diffracted and the remainder passed straight through. Because of this the intensity of the light reaching the display is from 2.5 to 10 times greater when using the transparency of the present invention than when using thin gratings using a silver halide emulsion or bleached silver halide emulsion said thin gratings being formed using the Ronchi ruling system. Silver halide gratings produced by the Ronchi ruling method are generally limited in resolution in the type of display device described herein to an upper frequency of about 200 lines per millimeter. However, in the case of the transparency of the present invention a practical range for the spatial frequency has been found to be from 500 to 750 lines per millimeter. This results in a much larger Bragg angle, thus larger angular separation of the wavelengths, which enables the display device to use individual lights as the light source directly without requiring the use of mirrors or fiber optics. At this spatial frequency for a transparency 40 microns thick the acceptance angle for visible light is about ±2.5°. For thicker gratings the acceptance angle can be as small as ±1°. Because of the laser beam interference pattern used to holographically expose the photosensitive material the process of the present invention can be used to create silver halide transparencies in which the major portion of the light diffracted thereby is in the +1 order of diffraction.

In addition to being useful in the textile industry for fiber and fabric producers, converters, and printers, the reproduction of colored areas of a pattern on a display screen in an optical viewer, with the displayed colored pattern recorded on a transportable proof, is also useful for designing, viewing, and merchandising wall and floor coverings, advertising layouts, commercial packaging, interior decoration, art and textile education, architecture, paper products (e.g., greeting cards, wrapping paper, party supplies), paint industry products, automotive styling, building construction, and the like.

I claim:

1. An optical viewer having a plurality of light sources which are independently variable as to color and intensity, mounted in said optical viewer, a film-like transparency from about 50 to about 200 microns in thickness having a plurality of mutually exclusive areas, each individual area containing differently oriented spatial frequency carriers formed of a photopolymerized organic resin, said spatial frequency carriers having a spacing of from 200 to 2,000 lines per millimeter, and each of said light sources being positioned so as to cooperate with an individual area of said transparency whereby light from said light source is diffracted onto a display.

2. The transparency of claim 1 wherein the spatial frequency carriers have a spacing of from 500 to 750 lines per millimeter.

* * * * *